United States Patent
Todd et al.

(10) Patent No.: US 12,488,321 B2
(45) Date of Patent: Dec. 2, 2025

(54) SMART CONTRACT DEPLOYMENT FOR DCF TRUST SERVICES BILLING

(71) Applicant: Dell Products L.P., Round Rock, TX (US)

(72) Inventors: Stephen J. Todd, North Andover, MA (US); Trevor Scott Conn, Leander, TX (US)

(73) Assignee: Dell Products L.P., Round Rock, TX (US)

( * ) Notice: Subject to any disclaimer, the term of this patent is extended or adjusted under 35 U.S.C. 154(b) by 173 days.

(21) Appl. No.: 18/053,490

(22) Filed: Nov. 8, 2022

(65) Prior Publication Data

US 2024/0152889 A1    May 9, 2024

(51) Int. Cl.
*G06Q 20/10* (2012.01)
*G06Q 20/38* (2012.01)
*G06Q 20/40* (2012.01)

(52) U.S. Cl.
CPC ....... *G06Q 20/102* (2013.01); *G06Q 20/3825* (2013.01); *G06Q 20/4016* (2013.01)

(58) Field of Classification Search
CPC ............. G06Q 20/102; G06Q 20/3825; G06Q 20/4016; G06Q 30/018; G06Q 30/04; G06Q 2220/00; H04L 9/3239; H04L 9/3247; H04L 9/50
See application file for complete search history.

(56) References Cited

U.S. PATENT DOCUMENTS

| | | |
|---|---|---|
| 7,302,641 B1 | 11/2007 | Yajima |
| 9,330,389 B2 | 5/2016 | Pitroda et al. |
| 10,135,607 B1 * | 11/2018 | Roets ............... H04L 9/3213 |
| 10,438,290 B1 | 10/2019 | Winklevoss et al. |
| 10,581,805 B2 | 3/2020 | Simons et al. |
| 10,601,665 B2 | 3/2020 | Bathen et al. |
| 10,871,948 B1 * | 12/2020 | Dowling ............ H04L 63/12 |
| 10,915,891 B1 | 2/2021 | Winklevoss et al. |

(Continued)

FOREIGN PATENT DOCUMENTS

| | | |
|---|---|---|
| WO | 2018/126077 A1 | 7/2018 |
| WO | 2019/210409 A1 | 11/2019 |

(Continued)

OTHER PUBLICATIONS

Ahmed G. Gad et al. "Emerging Trends in Blockchain Technology and Applications: A Review and Outlook." (Oct. 2022). Retrieved online Apr. 2, 2025. https://www.sciencedirect.com/science/article/pii/S1319157822000891 (Year: 2022).

(Continued)

*Primary Examiner* — Peter Ludwig
(74) *Attorney, Agent, or Firm* — Workman Nydegger (57) ABSTRACT

One method includes obtaining a snapshot of a data confidence fabric billing manifest, broadcasting the snapshot to one or more nodes of the data confidence fabric, deploying, at the nodes, billing logic included in the data confidence fabric billing manifest, and executing the billing logic to obtain information concerning a trust service provided regarding data associated with the nodes. The trust service may include trust annotating the data with an assessment as to the relative trustworthiness of the data.

20 Claims, 5 Drawing Sheets

(56) References Cited

U.S. PATENT DOCUMENTS

| | | |
|---|---|---|
| 11,108,891 B1 | 8/2021 | Todd et al. |
| 11,153,280 B1 | 10/2021 | Walwadkar |
| 11,188,977 B2 | 11/2021 | Youb et al. |
| 11,200,569 B1 | 12/2021 | James et al. |
| 11,308,487 B1 | 4/2022 | Foster et al. |
| 11,334,883 B1 | 5/2022 | Auerbach et al. |
| 11,416,230 B2 | 8/2022 | Todd et al. |
| 11,533,381 B1 | 12/2022 | Hockey |
| 11,562,333 B1 | 1/2023 | James et al. |
| 11,716,312 B1 | 8/2023 | Mcnamara, Jr. |
| 11,792,084 B1 | 10/2023 | Foukas et al. |
| 11,961,070 B2 | 4/2024 | Sarin |
| 11,971,862 B1 | 4/2024 | Han et al. |
| 11,978,044 B2 | 5/2024 | Basu et al. |
| 12,008,561 B2 | 6/2024 | Cona et al. |
| 12,032,696 B2 | 7/2024 | Todd |
| 12,045,879 B2 | 7/2024 | Rapowitz et al. |
| 12,118,613 B2 | 10/2024 | Foote et al. |
| 12,141,871 B1 | 11/2024 | James et al. |
| 2009/0024660 A1 | 1/2009 | Borgsmidt et al. |
| 2009/0028135 A1 | 1/2009 | Mantripragada et al. |
| 2009/0144313 A1 | 6/2009 | Hodge et al. |
| 2010/0082771 A1 | 4/2010 | Wood et al. |
| 2010/0153835 A1 | 6/2010 | Xiong et al. |
| 2011/0296510 A1 | 12/2011 | Hatlelid et al. |
| 2015/0379510 A1 | 12/2015 | Smith |
| 2016/0117668 A1 | 4/2016 | Pitroda et al. |
| 2017/0132620 A1 | 5/2017 | Miller et al. |
| 2018/0101906 A1 | 4/2018 | McDonald et al. |
| 2018/0218343 A1 | 8/2018 | Kolb et al. |
| 2018/0276626 A1 | 9/2018 | Laiben |
| 2018/0287800 A1* | 10/2018 | Chapman .............. H04L 9/3226 |
| 2018/0329693 A1* | 11/2018 | Eksten ...................... G06F 8/65 |
| 2019/0019251 A1 | 1/2019 | Phillips, IV |
| 2019/0116158 A1 | 4/2019 | Patil et al. |
| 2019/0238316 A1 | 8/2019 | Padmanabhan |
| 2019/0260803 A1 | 8/2019 | Bykampadi et al. |
| 2019/0303942 A1 | 10/2019 | Balaraman et al. |
| 2019/0333054 A1 | 10/2019 | Cona et al. |
| 2019/0347406 A1 | 11/2019 | Lev-Ran |
| 2019/0379642 A1 | 12/2019 | Simons et al. |
| 2019/0385153 A1 | 12/2019 | Cui et al. |
| 2019/0385154 A1 | 12/2019 | Cui et al. |
| 2019/0386969 A1 | 12/2019 | Verzun et al. |
| 2020/0007312 A1* | 1/2020 | Vouk ..................... H04L 9/3239 |
| 2020/0027089 A1 | 1/2020 | Kuchar et al. |
| 2020/0104819 A1 | 4/2020 | Garcia |
| 2020/0112443 A1* | 4/2020 | Todd ..................... H04L 9/3255 |
| 2020/0120023 A1 | 4/2020 | Munson et al. |
| 2020/0133955 A1 | 4/2020 | Padmanabhan et al. |
| 2020/0236102 A1 | 7/2020 | Azulay et al. |
| 2020/0313856 A1 | 10/2020 | Basu et al. |
| 2020/0344233 A1* | 10/2020 | Lai ..................... G06Q 20/4014 |
| 2021/0027404 A1 | 1/2021 | De Bold |
| 2021/0082044 A1 | 3/2021 | Sliwka et al. |
| 2021/0112117 A1 | 4/2021 | Munson et al. |
| 2021/0124727 A1 | 4/2021 | Todd et al. |
| 2021/0124728 A1 | 4/2021 | Todd et al. |
| 2021/0126794 A1* | 4/2021 | Forrester ................. G06F 21/64 |
| 2021/0164794 A1* | 6/2021 | Nagpal ................. H04L 9/3231 |
| 2021/0192520 A1 | 6/2021 | Patel et al. |
| 2021/0209684 A1 | 7/2021 | Foote et al. |
| 2021/0243167 A1* | 8/2021 | Todd ........................ H04L 9/50 |
| 2021/0243218 A1 | 8/2021 | Todd et al. |
| 2021/0304065 A1 | 9/2021 | Todd et al. |
| 2021/0328886 A1 | 10/2021 | Guim et al. |
| 2021/0342803 A1* | 11/2021 | Yoo ..................... G06Q 20/102 |
| 2021/0365445 A1 | 11/2021 | Robell et al. |
| 2021/0366586 A1 | 11/2021 | Ryan et al. |
| 2021/0374730 A1 | 12/2021 | Todd et al. |
| 2021/0385216 A1 | 12/2021 | Khalil et al. |
| 2021/0405983 A1* | 12/2021 | Todd ........................ G06F 21/64 |
| 2021/0409436 A1 | 12/2021 | Todd et al. |
| 2022/0021711 A1 | 1/2022 | Marsh et al. |
| 2022/0038289 A1* | 2/2022 | Huang .................. H04L 63/126 |
| 2022/0084015 A1 | 3/2022 | Fawzy et al. |
| 2022/0100858 A1 | 3/2022 | Todd |
| 2022/0100879 A1 | 3/2022 | Todd et al. |
| 2022/0116445 A1 | 4/2022 | Filippou et al. |
| 2022/0129555 A1 | 4/2022 | Todd |
| 2022/0138325 A1 | 5/2022 | Todd et al. |
| 2022/0188800 A1 | 6/2022 | Sells et al. |
| 2022/0210061 A1 | 6/2022 | Simu et al. |
| 2022/0253842 A1 | 8/2022 | James et al. |
| 2022/0261882 A1 | 8/2022 | Youb et al. |
| 2022/0272127 A1 | 8/2022 | Yawalkar et al. |
| 2022/0294690 A1 | 9/2022 | Nolan et al. |
| 2022/0327529 A1 | 10/2022 | Williams et al. |
| 2022/0351232 A1 | 11/2022 | Chan et al. |
| 2023/0114684 A1 | 4/2023 | Jakobsson et al. |
| 2023/0155984 A1 | 5/2023 | Adam et al. |
| 2023/0173395 A1 | 6/2023 | Cella et al. |
| 2023/0196318 A1 | 6/2023 | Rosen et al. |
| 2023/0230091 A1 | 7/2023 | Vaughn |
| 2023/0237403 A1 | 7/2023 | Reineke et al. |
| 2023/0237499 A1 | 7/2023 | Padmanabhan |
| 2023/0334492 A1 | 10/2023 | Tai et al. |
| 2023/0351393 A1 | 11/2023 | Cella et al. |
| 2023/0362015 A1 | 11/2023 | Kayaba et al. |
| 2024/0046318 A1 | 2/2024 | Muriqi |
| 2024/0106839 A1 | 3/2024 | Smith et al. |
| 2024/0152911 A1 | 5/2024 | Rezaiean-Asel et al. |
| 2024/0249277 A1 | 7/2024 | Hwang |
| 2024/0256691 A1 | 8/2024 | Hwang |
| 2024/0281799 A1 | 8/2024 | Ryan |
| 2024/0289776 A1 | 8/2024 | Bimolaksono et al. |
| 2024/0354735 A1 | 10/2024 | Kell et al. |
| 2024/0354747 A1 | 10/2024 | Belostock et al. |
| 2024/0364521 A1 | 10/2024 | Tang |
| 2025/0088376 A1 | 3/2025 | Ren et al. |

FOREIGN PATENT DOCUMENTS

| | | |
|---|---|---|
| WO | 2020/124317 A1 | 6/2020 |
| WO | 2021/173716 A1 | 9/2021 |

OTHER PUBLICATIONS

Choudhury et al. "Impact of Distributed Ledger Technology in Global Capital Markets." (May 16, 2023) Retrieved online Apr. 2, 2025. https://www.gfma.org/wp-content/uploads/2023/05/impact-of-dlt-on-global-capital-markets-full-report.pdf (Year: 2023).

John Kolb. "A Languge-Based Approach to Smart Contract Engineering." (Dec. 18, 2020). Retrieved online Apr. 2, 2025. https://www2.eecs.berkeley.edu/Pubs/TechRpts/2020/EECS-2020-220.pdf (Year: 2020).

Murphy et al, Towards trust-based data weighting in machine learning, 2023 IEEE 31ST International Conference on Network Protocols (ICNP), pp. 1-6 (Oct. 2023) (Year: 2023).

\* cited by examiner

SMART CONTRACT DEPLOYMENT FOR DCF TRUST SERVICES BILLING

FIELD OF THE INVENTION

Embodiments of the present invention generally relate to tracking the performance of trust services in various environments, such as edge computing environments for example. More particularly, some embodiments of the invention relate to systems, hardware, software, computer-readable media, and methods for the implementation and use of smart contracts in a data confidence fabric environment.

BACKGROUND

Edge computing configurations and environments are complex deployments, with distributed hardware and software often spanning multiple geographies, networks, vendors, and policies. A Data Confidence Fabric (DCF) may be employed to provide trust or confidence in the data that flows across a complex edge ecosystem. These trust related services may be provided by the enterprise that owns and controls the DCF, or may alternatively be provided by a vendor.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

DETAILED DESCRIPTION OF SOME EXAMPLE EMBODIMENTS

Embodiments of the present invention generally relate to tracking the performance of trust services in various environments, such as edge computing environments for example. More particularly, some embodiments of the invention relate to systems, hardware, software, computer-readable media, and methods for the implementation and use of smart contracts in a data confidence fabric environment.

In general, one or more embodiments of the invention may be directed to methods by way of which varied and distributed providers of trust services in a DCF may be compensated for those services through the definition and deployment of DCF-related smart contract configuration requests.

In one example embodiment, a DCF billing manifest may be defined that may include smart contract billing logic, vendor and data owner IDs, trust annotation and billing ledgers, and a time range to be covered by the billing agreement. The DCF billing manifest may be signed by the data owner to signify approval, by the data owner, of the terms of the DCF billing manifest. A snapshot may be taken of the approved DCF billing manifest and then broadcast to a DCF configuration agent of the DCF. The DCF configuration agent may then activate the billing mechanisms included in, or implied by, the DCF billing manifest. The billing mechanism may be included as part of the operation of the DCF trust services. In this way, the provider of the DCF trust services may track the performance of trust services, and then bill the data owner accordingly.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

In particular, an embodiment of the invention may operate to track the performance of trust services in various environments, such as edge computing environments for example. An embodiment may enable a trust services vendor to accurately track, and bill for, the provision of trust services at one, some, or all, nodes of a DCF. Such tracking may include, for example, identifying which trust service(s) were provided, at which node(s), when, and for how long. An embodiment may provide for the deployment of smart contracts in a DCF environment that may include thousands, tens of thousands, or more, nodes. Various other advantages of some example embodiments will be apparent from this disclosure.

It is noted that embodiments of the invention, whether claimed or not, cannot be performed, practically or otherwise, in the mind of a human. Accordingly, nothing herein should be construed as teaching or suggesting that any aspect of any embodiment of the invention could or would be performed, practically or otherwise, in the mind of a human. Further, and unless explicitly indicated otherwise herein, the disclosed methods, processes, and operations, are contemplated as being implemented by computing systems that may comprise hardware and/or software. That is, such methods processes, and operations, are defined as being computer-implemented.

A. Aspects of an Example Architecture and Environment

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively form computing environments, such as edge computing environments for example. One or more embodiments may be employed in computing environments that comprise, or implement, a portion of a data confidence fabric (DCF).

Note that as used herein, the term 'data' is intended to be broad in scope. Thus, that term embraces, by way of example and not limitation, data segments such as may be produced by data stream segmentation processes, data chunks, data blocks, atomic data, emails, objects of any type, files of any type including media files, word processing files, spreadsheet files, and database files, as well as contacts, directories, sub-directories, volumes, and any group of one or more of the foregoing.

Example embodiments of the invention are applicable to any system capable of storing and handling various types of objects, in analog, digital, or other form. Although terms such as document, file, segment, block, or object may be used by way of example, the principles of the disclosure are not limited to any particular form of representing and storing data or other information. Rather, such principles are equally applicable to any object capable of representing information.

In general, a DCF may include various nodes, which may comprise hardware and/or software, through which the data passes as the data moves through the DCF. Trust information, and confidence information, concerning the data may be inserted at one or more of these nodes as the data transits the DCF. The trust information may indicate, for example, a relative extent to which the data may be considered trustworthy by a user of the data, such as an application for example. The confidence information may indicate a relative level of confidence in the trustworthiness of the data.

Thus, if data passes through a node that is considered untrustworthy for some reason, the confidence in the integrity and reliability of that data may be relatively low. That is, the trust information may be a function of, for example, the nature and operation of the node(s) through which the data passes. To illustrate, if a node that handles the data is determined to have inadequate security controls, data that has passed through that node may be assessed as relatively untrustworthy and the confidence in that data may be correspondingly low. Thus, an application that may have a need for the data may consider the confidence level, or confidence score, of the data in determining whether or not to use that data.

Figure 1:
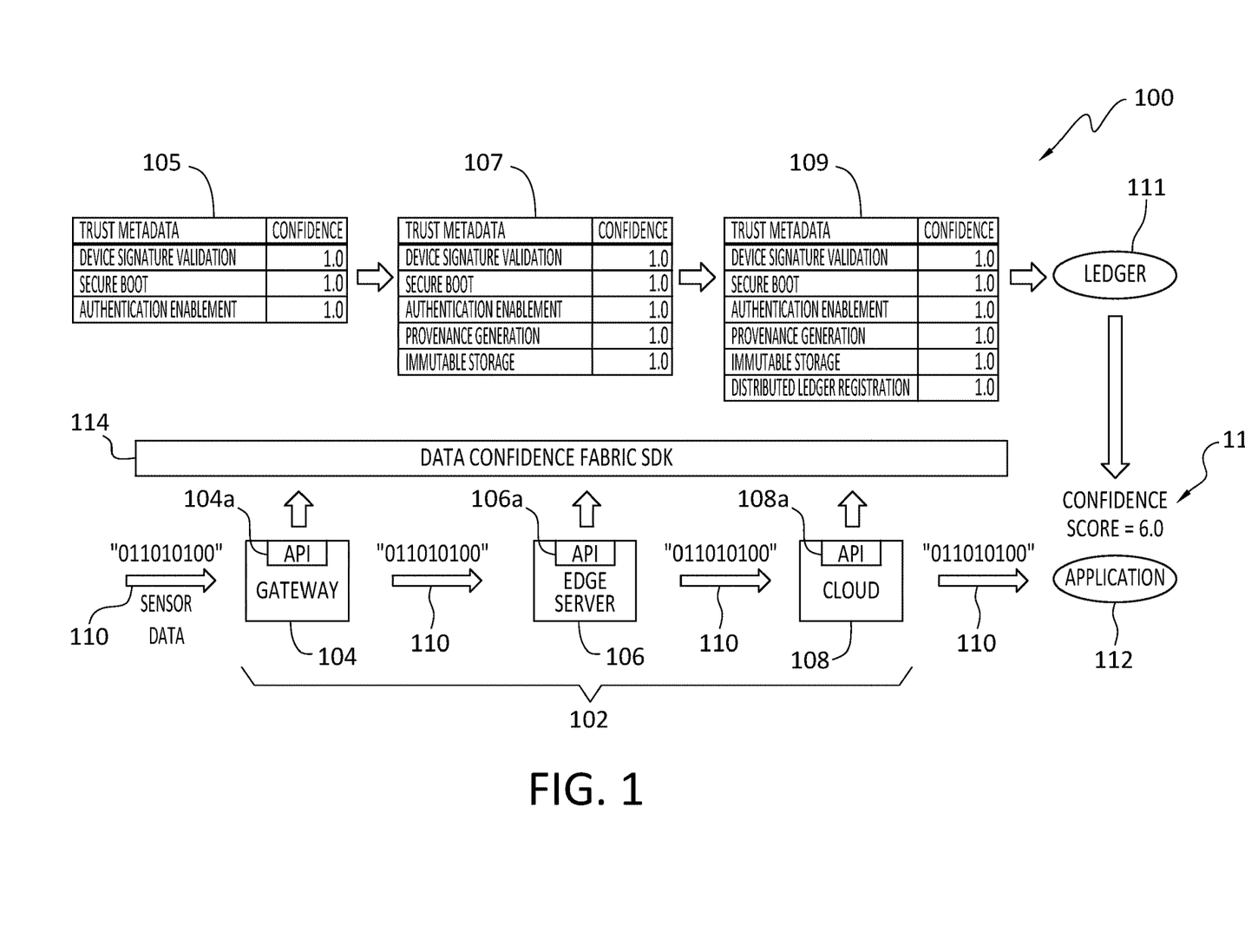
FIG. 1 discloses aspects of a data confidence fabric (DCF) according to an embodiment.

Turning now to FIG. 1, details are provided concerning an example DCF Annotation and Scoring Framework, or simply DCF, 100 in connection with which an embodiment of the invention may be employed. As shown, the DCF 100 may include various nodes 102, examples of which may include a gateway 104, an edge server 106, and a cloud site 108, through which data 110 may pass. The data 110 may ultimately be used, or consumed, by an end user 112, such as an application for example.

In an embodiment, the data 110 may be generated by a node such as a sensor, which may comprise an IoT (Internet of Things) edge device for example. Each of the nodes 102 may comprise a respective API 104a, 106a, and 108a, that the nodes 102 may use to communicate confidence information to a DCF SDK (software development kit) 112.

Consider, in the example of FIG. 1, the layers of trust that may be provided in the DCF 100. Particularly, the gateway 104 may have an embedded Intel TPM chip and it may use that chip to perform "trust services" on behalf of the owner of the data 110. In the example above, a "secure boot" annotation, in the trust metadata 105 for the gateway 104, may indicate that the gateway 104 has not been tampered with. The TPM chip may also provide keys used to perform signature services on the data 110. As well, in the example of FIG. 1, the edge server 106 may leverage an ARM secure enclave to perform a "trust service," inspecting the data 110 and performing analytics on it. Finally, a cloud application, such as the Dell Streaming Data Platform running at the cloud site 108, may perform additional trust services on the data 110 such as, for example, inspect the data 110 for drift, as may be done if the data is coming from a sensor with a well-known range of values and/or a long history of stable behavior.

As further indicated in FIG. 1, trust metadata generated at each state of the data 110 journey may be added to trust metadata generated at upstream nodes. Thus, for example, the trust metadata 105 may have been generated at the gateway 104, and the trust metadata 107 may include both the trust metadata 105 and trust metadata generated at the edge server 106. Finally, the trust metadata 109 may include trust metadata generated at the cloud site 108, as well as the trust metadata generated at the edge server 106, and at the gateway 104.

The accumulated trust metadata 109 may be stored in an immutable ledger 111 that may be accessible by the application 112. Additionally, or alternatively, a confidence score 113 may be generated based on the trust metadata 109, and made available to the application 112 or other data 110 end user(s).

The recipient, that is, the data owner, of these trust services that insert trust metadata may require this level of trust insertion in order that their applications, such as the application 112 for example, can produce insights from the data 110 with confidence that the data 110 is trustworthy. The trust insertion functionality may be of great value because it may significantly reduce the risk of dangerous actuation or other business logic resulting from low-quality, erroneous, or malicious data. Trust services may also significantly reduce the risk of regulatory compliance violations. Preventing these violations may enable trust service recipients to avoid regulatory fines. One or more embodiments of the invention may enable the vendors providing these trust/confidence services to accurately track the provision of these services in a DCF, and an embodiment may also enable the vendor to bill the data owner, and/or other trust service consumers. Details concerning some example functionalities that may be provided by an embodiment are set forth in the following section.

B. Aspects of Example Functionalities of Some Embodiments

In an embodiment, a DCF may leverage distributed ledger technology (DLT) as an annotation store. DLTs may possess characteristics that may be important for some DCF operations. Such characteristics may include, but are not limited to: the requirement for a well-known identity to digitally sign each annotation; the existence of consensus algorithms that can confirm the validity of the annotation; and, DLT ledger entries are immutable and non-deletable, guaranteeing post annotation audit execution. Still another advantage of DLTs, as implemented in connection with a DCF according to one or more embodiments, is their ability to execute smart contracts, that is, business logic well-known to the DLT that can execute multi-party agreements that have been codified ahead of time. In an embodiment, these smart contracts may be used to coordinate payments transparently and accurately to multiple vendors for trust services provided in a DCF. An embodiment may possess various features and aspects that enable that embodiment to implement such functionality. Examples of such features and aspects are discussed below.

B.1 Smart Contract DCF Terms

An embodiment may define and implement a smart contract that is aware of DCF annotation primitives and, as such, may define and implement business logic that describes payment terms based on those primitives within a DLT/DCF context. Thus, an embodiment may, for example, enable a data owner to be billed for annotation activities, scoring activities, and/or other activities.

B.2 Vendor Association with DCF Annotations

An embodiment may define and implement smart contract business logic that associates a DCF primitive, such as PKI (public key infrastructure) annotation for example, with a vendor, or vendor wallet for example, that would receive payment for providing trust services in the context of a DCF. Note that as used herein, "vendor" is intended to be broadly construed. To illustrate, a vendor such as AMD or Intel for example, may provide a secure enclave. The secure enclave may be a protected memory space in which all or part of an application executes. The application itself annotates whether it is running in the enclave and calls out to the DCF via the SDK to attest to the fact. Particularly, the vendor may provide low-level HW (hardware) that executes DCF operations, while another vendor may be a high-level aggregator, such as a Dell server that contains multiple vendor components.

Note further that, as used herein, a "primitive" embraces, but is not limited to, some discrete aspect, quality, or property, of the operating environment hosting the application in which data is created, handled, and/or modified. To illustrate, some example primitives may include, but are not limited to, an onboard TPM in a DCF component, an encrypted channel by way of which the DCF receives data from an edge device, a secure enclave in which an application is operating, and a verified signature associated with data received by an application and/or the DCF.

B.3 Real-Time, Versus Post-Annotation, Payments

An owner of data may wish to have the flexibility to "pay as they go" versus "pay periodically," for DCF services provided by a vendor with respect to that data. Thus, an embodiment may provide mechanisms that integrate with a DCF that can facilitate such payment terms flexibility.

B.4 Annotation Ledger Versus Smart Contract Ledger

In an embodiment, a ledger that stores the annotations made at the various nodes of a DCF may support the ability to execute smart contracts. In an embodiment, there may be reasons to keep separate ledgers, such as one ledger for trust metadata only, and another separate ledger for bookkeeping/billing information.

B.5 Decentralized Communication of Smart Contract Terms to a DCF

An embodiment may define and implement a management paradigm to inform a DCF that billing agreements have been put in place with respect to trust services provided concerning data in the DCF. Correspondingly, an embodiment may define and implement a mechanism to program a DCF to conform to a new, or initial, billing paradigm, as well as a mechanism to time the deployment and operation of new contract terms such as, for example, when to cut over to a new billing agreement.

B.6 Wallet Depletion Configuration

Another aspect of an embodiment is the ability to deal, in a DCF billing ecosystem, with a circumstance where a vendor wallet, or other account, has insufficient funds to pay for DCF confidence services rendered, or to be rendered. Particularly, an embodiment may configure the DCF ecosystem to deal with such a use case. For example, an embodiment may, in this example use case, take various approaches such as, but not limited to: cause the provision of trust services in the DCF to cease; switch to a secondary or backup billing system; prevent the performance of trust services for the data; and, determine if a funding source can be accessed real-time.

C. Further Aspects of Some Embodiments

Following are some aspects of an example embodiment. Note that an embodiment may, or may not, include any one, or more, of such aspects. Further, no embodiment should be construed as requiring any/all of such aspects, or as requiring any subset of such aspects.

In more detail now, aspects that may be included in one or more embodiments may include any one or more of the following:
- encoding of "confidence billing logic" into smart contracts;
  - real-time versus batch is specified; and
  - business logic for wallet depletion handling may be included;
- specific vendor and target wallets ids may be mapped to confidence services provided by the vendor;
- information about target ledgers (annotation and/or billing) for the DCF ecosystem may be specified;
- the date that the billing (t="N") goes into effect may be recorded, along with the time duration of the billing (for example, an agreement may specify that particular trust services are to be provided for 12 months, or until the data for which the services are provided is deleted from the DCF or other system(s));
- a snapshot of the information noted above (which may collectively define a DCF billing manifest) may be captured and digitally signed by a trusted authority such as, for example, the company deploying or managing the DCF;
  - the signature may be accomplished in any number of ways such as, for example, by writing to a "configuration ledger," or by storing the digitally signed snapshot in an immutable object store;
- the snapshot may have a unique ID associated with it such as, for example, a ledger address, or object ID;
- the snapshot may be broadcast, or polled, or otherwise distributed or made available by any other suitable mechanism, so that all elements, such as the nodes, of the DCF ecosystem have the information needed to track the provision of one or more trust services by one or more vendors;
- the snapshot may be validated, for example, the signature on the snapshot may require confirmation that a trusted authority has created the billing instructions in the DCF billing manifest that was the basis for the snapshot; and
- the snapshot billing business logic may be deployed and begin executing at any time T=N.

C.1 DCF Smart Contract Deployment

Figure 2:
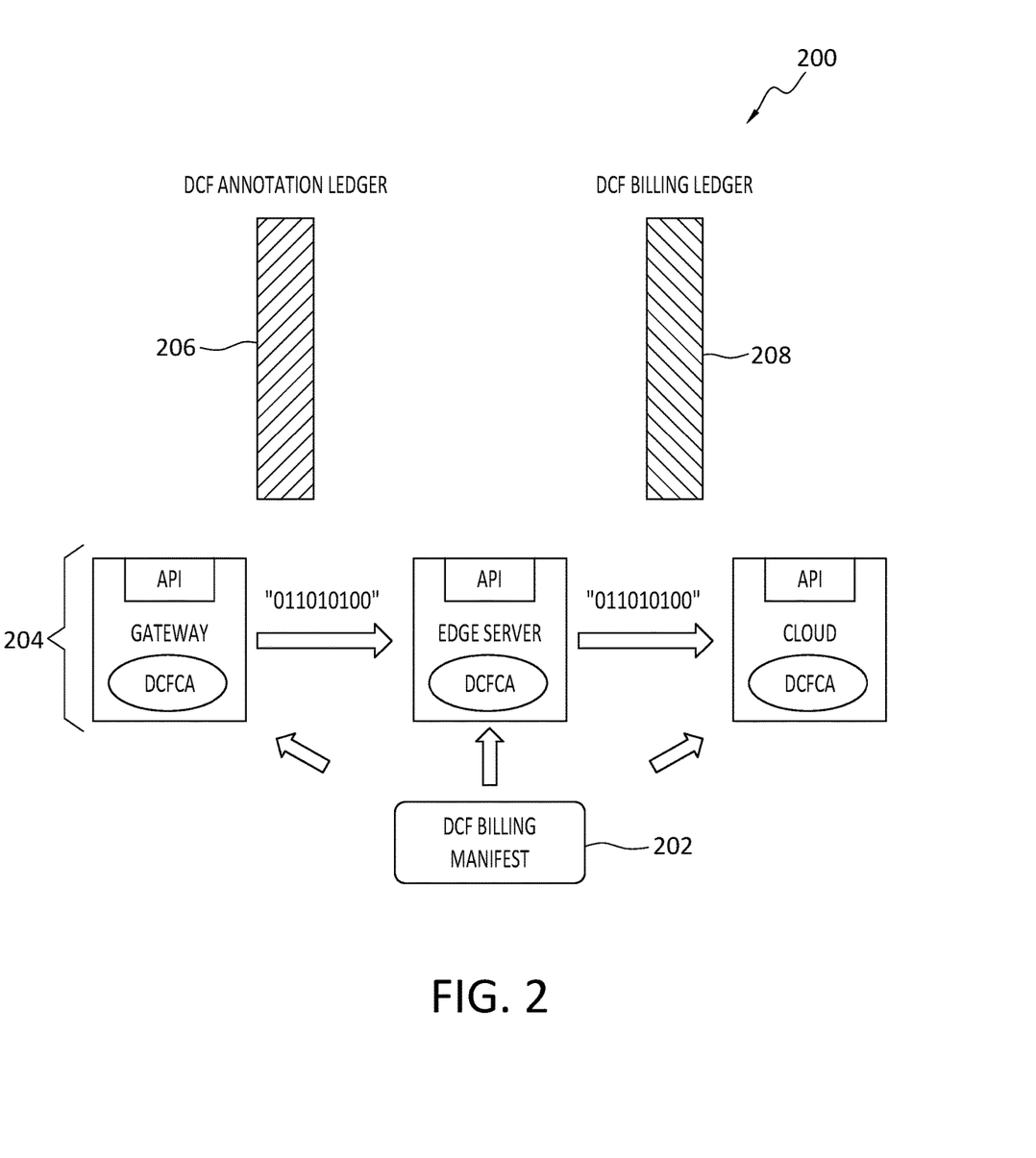
FIG. 2 discloses aspects of a DCF smart contract deployment according to an embodiment.

With reference now to FIG. 2, details are provided concerning one example high-level embodiment of the invention. These details are provided only by way of example and are not intended to limit the scope of the invention in any way.

In the example configuration 200 of FIG. 2, a DCF billing manifest 202 is provided that may be supplied to one, some, or all, of the nodes 204 of the DCF. In an embodiment, a respective agent at each node 204 may receive, and act on, the DCF billing manifest 202. The configuration 200 may further comprise a DCF annotation ledger 206, one example of which is denoted at 111 in FIG. 1. The configuration 200 may further comprise a DCF billing ledger 208 that may hold billing metadata. In an embodiment, the DCF billing ledger and the DCF annotation ledger are separate entities and, in another embodiment, the two ledgers are combined into a single ledger. In an embodiment, either or both of the DCF billing ledger 208 and the DCF annotation ledger 206 may comprise an immutable ledger, one example of which is a blockchain.

C.1.1 DCF Billing Manifest

Figure 3:
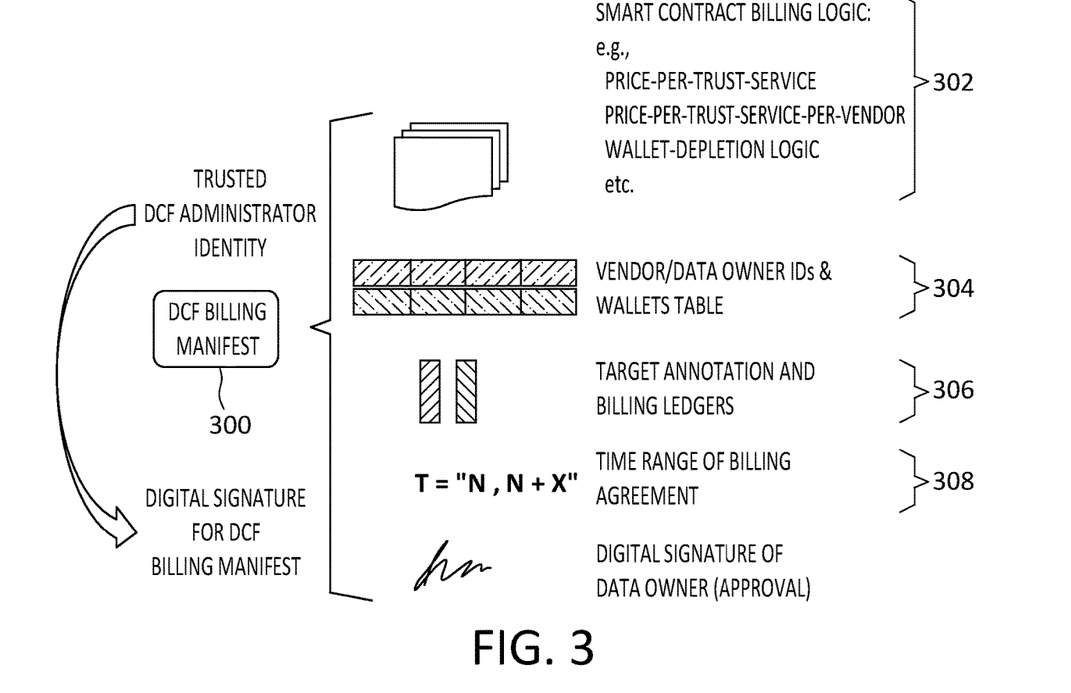
FIG. 3 discloses elements of a DCF billing manifest according to an embodiment.

With attention next to FIG. 3, an example DCF billing manifest 300 according to an embodiment is disclosed. In general, a DCF billing manifest may contain the complete information required to implement a support billing agreement amongst the multiple parties that may be involved in the DCF. Such parties may include, for example, the owner of data that will be contained in the DCF at some point, and all vendors who provide trust services with respect to that data while the data is in the DCF.

A DCF billing manifest may be generated by a data owner, a vendor, or other party. The DCF billing manifest may be generated in the DCF itself, at a vendor site, or elsewhere. In an embodiment, a DCF billing manifest may comprise a markup document, such as a JSON (JavaScript Object Notation) for example, but no particular form, or format, is required for a DCF billing manifest.

With particular reference now to the example DCF billing manifest 300, one element of the DCF billing manifest 300 may be smart contract billing logic 302. The smart contract billing logic 302 may comprise any logic related to how much the data owner is charged for specific trust services such as, but not limited to, annotations, confidence score calculations, or any DCF-related operation. This charge may vary, for example, by the amount of data being annotated, the size (possibly measured in terms of the number of nodes) of the DCF, by trust service type, and/or, per vendor. To illustrate, with respect to the vendor case, in an example where multiple vendors are performing the same type of trust service, such as secure enclave for example, one vendor may believe its secure capabilities are more powerful/valuable than those provided by another vendor. The smart contract billing logic 302 may additionally, or alternatively, comprise logic that bases billing, either in whole or in part, on the amount of time the trust services are provided, and/or, the amount of data for which the trust services are provided.

The smart contract billing logic 302 may also contain business logic that specifies what to do when the payment or billing system breaks down, such as when there are insufficient funds available due to wallet depletion. Further, the smart contract billing logic 302 may specify when billing should be triggered. For example, billing may be triggered in real-time as the trust services are provided, or may be triggered periodically, such as monthly for example.

With continued reference to FIG. 3, the DCF billing manifest 300 may also include vendor and data owner IDs and wallet information, collectively denoted at 304, that may enable the system to know the source account, which may take the form of a digital wallet for example, from which funds will be withdrawn to pay for the trust services provided. The vendor and data owner IDs and wallet information may also enable the system to know the target account to which those funds are to be transferred.

The DCF billing manifest 300 may further comprise information identifying the target ledger, and billing annotation ledger, collectively denoted at 306 in FIG. 3. An example target ledger, which may also be referred to herein as a DCF annotation ledger, is referenced at 206 in FIG. 2. An example billing annotation ledger, which may also be referred to herein as a DCF billing ledger, is referenced at 208 in FIG. 2. As noted in the discussion of FIG. 2, a target ledger, and billing annotation ledger, may be combined into a single ledger, or may exist as separate and discrete ledgers.

As also disclosed in FIG. 3, the DCF billing manifest 300 may include information the specifies a time range 308 covered by a trust services billing agreement. For example, the time range for a billing agreement may be specified as starting on midnight on the 1st day of the month and continuing until 11:59:59 PM on the last day of the month.

It is noted that the contents 302-308 of the example DCF billing manifest 300 are presented only by way of example and are not intended to limit the scope of the invention in any way. One or more other embodiments of a DCF billing manifest may include addition, or alternative, elements.

Once the DCF billing manifest 300 has been generated, the data owner, or other party who will be paying for the confidence services, may review the contents of the DCF billing manifest 300, and if those contents are acceptable, may then digitally sign the DCF billing manifest 300. By signing the DCF billing manifest, the data owner may render the DCF billing manifest immutable. If the parties decide to change the terms under which trust services are to be provided, a new DCF billing manifest, superseding the earlier DCF billing manifest, may be generated to memorialize the agreed upon new terms. The signed DCF billing manifest may then constitute (1) acceptance of the smart contract billing logic by the data owner, and (2) the authorization, by the data owner, for trust service payments to be made by the data owner to the vendor.

C.1.2 Creation and Broadcast of a DCF Billing Manifest Snapshot

After a DCF billing manifest has been created and signed, so as to constitute a point-in-time snapshot of a billing agreement between, for example, a vendor and data owner, the snapshot may then be communicated across a decentralized DCF infrastructure. In an embodiment, the DCF infrastructure may comprise hundreds, thousands, or more, of gateways, edge servers, cloud locations, and other nodes and node types.

Figure 4:
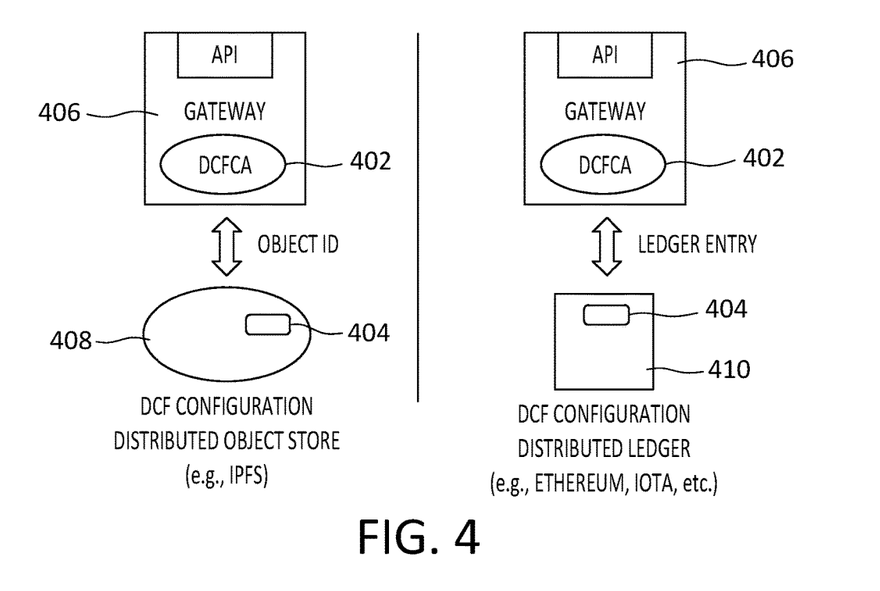
FIG. 4 discloses various mechanisms for broadcasting a DCF billing manifest, or snapshot, according to an embodiment.

With reference now to FIG. 4, some examples of the broadcasting of a signed DCF billing manifest, which may be referred to as a "snapshot," are disclosed. In general, in an embodiment, the snapshot may be broadcast to any specified node(s) in a DCF and may initially be received by a DCF configuration agent 402 of the DCF. Particularly, the DCF configuration agent 402 may take the form of a DCF-enabled application, for receiving and handling a snapshot 404. No particular form or configuration of a DCF configuration agent is required however. In an embodiment, a respective instance of the DCF configuration agent 402 may reside at one or more of the nodes 406.

On startup, the DCF configuration agent 402 may be instructed, such as by way of a configuration, command line entry, or other mechanism, as to the location from where the snapshot 404 may be retrieved. Obtaining of the snapshot 404 may be implemented, for example, by a pull process in which the DCF configuration agent 402 pulls the snapshot 404 down from a location where the snapshot 404 is stored. Alternatively, the DCF configuration agent 402 may subscribe to a service that provides the snapshot 404 to the DCF configuration agent 402. In any case, the snapshot 404 may be stored in various different ways, such as at an object store 408, or in a distributed ledger 410. As noted earlier, part of snapshot 404 may be a specification of the window of time for which the associated agreement is valid. When the time of expiration is near, such as ten days prior to expiration, the DCF configuration agent 402 may receive the new snapshot 404 in the same, or a different, manner as that by which the prior snapshot 404 was received by the DCF configuration agent 402.

In another embodiment, the snapshot 404 may be stored in a distributed ledger 410. In this example, a signature included in the snapshot 404 may be inferred by the ledger entry itself. Note that some ledgers, such as the ledger 410 for example, may also have the added benefit that other parties, such as the data owner and/or vendor for example, have come to a consensus that the snapshot 404 is legitimate before the snapshot 404 will be stored in the ledger.

C.1.3 DCF Smart Contract Deployment and Execution

Once the snapshot, such as the snapshot 404 for example, has been received and validated by a DCF configuration agent, such as the DCF configuration agent 402, the DCF configuration agent may then insert pointers to the smart contract billing metadata, such as billing logic, wallet depletion logic, and location of ledgers, for example, and activate the billing mechanisms, at such time as may be dictated by the snapshot, as part of the operation of the DCF annotation and/or scoring logic. Note that if the time expires, there may be logic, such as may be used in the wallet depletion use case, that may execute some other type of agreement. When the billing mechanisms have been activated at the applicable node(s), the provision of trust services at those nodes may then be tracked, and billed, according to the parameters of the snapshot.

C.1.4 DCF Billing As-A-Service (BaaS)

In an embodiment, the billing functionality disclosed herein may be provided to a data/DCF owner as-a-Service by a billing vendor. The billing vendor may, or may not, be the same as the vendor that provides the trust services. The billing vendor may be hosted at a cloud site remote from the DCF, although that is not necessarily required, and the billing vendor may provide its services from any other suitable point.

D. Example Methods

It is noted with respect to the disclosed methods, including the example method of FIG. 4, that any operation(s) of any of these methods, may be performed in response to, as a result of, and/or, based upon, the performance of any preceding operation(s). Correspondingly, performance of one or more operations, for example, may be a predicate or trigger to subsequent performance of one or more additional operations. Thus, for example, the various operations that may make up a method may be linked together or otherwise associated with each other by way of relations such as the examples just noted. Finally, and while it is not required, the individual operations that make up the various example methods disclosed herein are, in some embodiments, performed in the specific sequence recited in those examples. In other embodiments, the individual operations that make up a disclosed method may be performed in a sequence other than the specific sequence recited.

Figure 5:
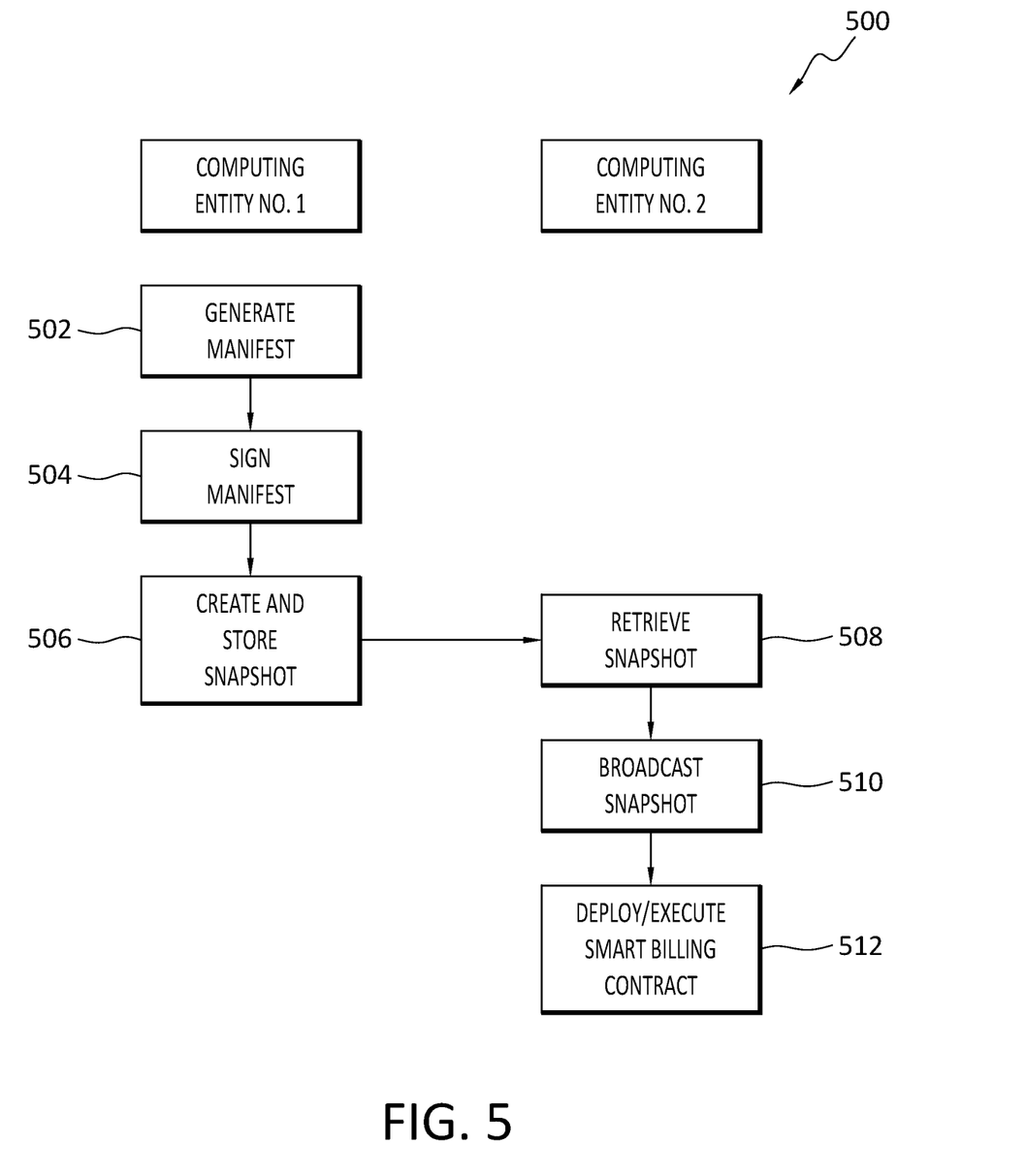
FIG. 5 discloses aspects of an example method according to an embodiment.

Directing attention now to FIG. 5, a method according to one embodiment is generally denoted at 500. In an embodiment, part or all of the method 500 may be cooperatively performed by two or more entities, such as a trust services vendor and a data owner, for example. In another embodiment, the entire method 500 may be performed by a single entity. In one example embodiment, the "computing entity no. 1" and the "computing entity no. 2" may comprise respective elements of a DCF. More generally, the functional allocation disclosed in FIG. 5 is provided only by way of example, and is not intended to limit the scope of the invention in any way.

The example method 500 may begin with the generation 502 of a DCF billing manifest. When the involved parties agree to the billing logic in the DCF billing manifest, the DCF billing manifest may be signed 504. In an embodiment, the signing 504 may comprise using digital signature, such as of a data owner, to sign the DCF billing manifest. After signature 504, the DCF billing manifest may be immutable.

After the DCF billing manifest has been signed 504, the signed DCF billing manifest may then be stored 506. As part of 506, or separately, a snapshot may be taken of the signed DCF billing manifest. In an embodiment, the signed DCF billing manifest may, itself, comprise the snapshot, such that a separate snapshot process may not be needed.

At some point after creation and storage of the snapshot 506, the snapshot may be retrieved by, or pushed to, an entity such as a DCF configuration agent for example. The DCF configuration may then broadcast the snapshot 508 to one or more nodes of a DCF. The billing logic in the snapshot may then be deployed and executed 510 at those nodes. Among other things, the deployment and execution of the billing logic in the snapshot may cause the collection of information concerning trust services provided at the nodes. The collected information may then be provided, such as to a trust services vendor for example, to enable a billing process for the trust services.

E. Further Example Embodiments

Following are some further example embodiments of the invention. These are presented only by way of example and are not intended to limit the scope of the invention in any way.

Embodiment 1

A method, comprising: obtaining a snapshot of a data confidence fabric billing manifest; broadcasting the snapshot to one or more nodes of the data confidence fabric; deploying, at the nodes, billing logic included in the data confidence fabric billing manifest; and executing the billing logic to obtain information concerning a trust service provided regarding data associated with the nodes.

Embodiment 2

The method as recited in embodiment 1, wherein the billing logic comprises any one or more of: price-per-trust service; price-per-trust service-per vendor; or wallet depletion logic.

Embodiment 3

The method as recited in any of embodiments 1-2, wherein the information specifies which trust service are provided to which nodes.

Embodiment 4

The method as recited in any of embodiments 1-3, wherein the information obtained by executing the billing logic is provided to a trust service vendor.

Embodiment 5

The method as recited in any of embodiments 1-4, wherein the billing logic specifies an action to be taken if an owner of the data does not pay a trust services vendor for performance of the trust service.

Embodiment 6

The method as recited in any of embodiments 1-5, wherein terms of the data confidence fabric billing manifest have been agreed to by an owner of the data and a vendor of the trust service.

Embodiment 7

The method as recited in any of embodiments 1-6, wherein the snapshot includes a digital signature of a party to an agreement concerning the billing logic.

Embodiment 8

The method as recited in any of embodiments 1-7, wherein the data confidence fabric billing manifest specifies a ledger where annotations of the data, made by the trust service, are stored.

Embodiment 9

The method as recited in any of embodiments 1-8, wherein the data confidence fabric billing manifest specifies a ledger where billing information relating to the trust service is stored.

Embodiment 10

The method as recited in any of embodiments 1-9, wherein the trust service comprises annotating the data with an assessment as to the relative trustworthiness of the data.

Embodiment 11

A system, comprising hardware and/or software, operable to perform any of the operations, methods, or processes, or any portion of any of these, disclosed herein.

Embodiment 12

A non-transitory storage medium having stored therein instructions that are executable by one or more hardware processors to perform operations comprising the operations of any one or more of embodiments 1-10.

F. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 6:
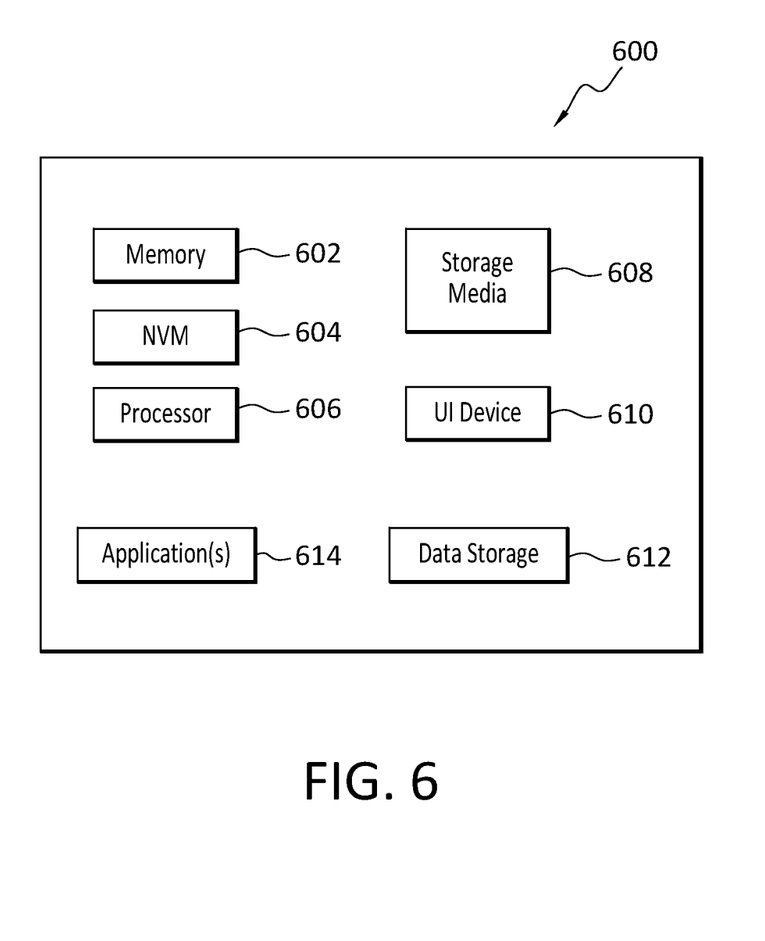
FIG. 6 discloses an example computing entity operable to perform any of the disclosed methods, processes, and operations.

With reference briefly now to FIG. 6, any one or more of the entities disclosed, or implied, by FIGS. 1-5 and/or elsewhere herein, may take the form of, or include, or be implemented on, or hosted by, a physical computing device, one example of which is denoted at 600. As well, where any of the aforementioned elements comprise or consist of a virtual machine (VM), that VM may constitute a virtualization of any combination of the physical components disclosed in FIG. 6.

In the example of FIG. 6, the physical computing device 600 includes a memory 602 which may include one, some, or all, of random access memory (RAM), non-volatile memory (NVM) 604 such as NVRAM for example, read-only memory (ROM), and persistent memory, one or more hardware processors 606, non-transitory storage media 608, UI (user interface) device 610, and data storage 612. One or more of the memory components 602 of the physical computing device 600 may take the form of solid state device (SSD) storage. As well, one or more applications 614 may be provided that comprise instructions executable by one or more hardware processors 606 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
generating a data confidence fabric billing manifest;
rendering the data confidence fabric billing manifest immutable by signing the data confidence fabric billing manifest;
creating a snapshot of the data confidence fabric billing manifest, wherein the snapshot comprises parameters including a smart contract billing logic, a data owner identification, digital wallet information of the data owner, vendor information of a trust service, a time to activate the smart contract billing logic, and a digital signature signed in the data confidence fabric billing manifest;
storing the snapshot of the data confidence fabric billing manifest at an initial node of a plurality of nodes;
broadcasting the snapshot to a specific subset of the plurality of nodes of the data confidence fabric, where the specific subset does not include at least one node of the plurality of nodes;
commanding a data confidence agent to pull the snapshot from the initial node where the snapshot is stored;
in response to the commanding, pulling, by the data confidence fabric configuration agent, the snapshot from the initial node;
deploying, by the data confidence fabric configuration agent and at the specific subset of nodes, the smart contract billing logic included in the snapshot of the data confidence fabric billing manifest; and
activating, by the data confidence fabric configuration agent, the smart contract billing logic at the time and at the specific subset of nodes, thereby provisioning the trust services at the specific subset of nodes, where the activating further includes tracking and billing for the trust services rendered at the subset of nodes according to the parameters of the snapshot.

2. The method as recited in claim 1, wherein the billing logic comprises any one or more of: price-per-trust service; price-per-trust service-per vendor; or wallet depletion logic.

3. The method as recited in claim 1, wherein the information specifies which trust service are provided to which nodes.

4. The method as recited in claim 1, wherein the information obtained by executing the billing logic is provided to a trust service vendor.

5. The method as recited in claim 1, wherein the billing logic specifies an action to be taken if an owner of the data does not pay a trust services vendor for performance of the trust service.

6. The method as recited in claim 1, wherein terms of the data confidence fabric billing manifest have been agreed to by an owner of the data and a vendor of the trust service.

7. The method as recited in claim 1, wherein the snapshot includes a digital signature of a party to an agreement concerning the billing logic.

8. The method as recited in claim 1, wherein the data confidence fabric billing manifest specifies a ledger where annotations of the data, made by the trust service, are stored.

9. The method as recited in claim 1, wherein the data confidence fabric billing manifest specifies a ledger where billing information relating to the trust service is stored.

10. The method as recited in claim 1, wherein the trust service comprises annotating the data with an assessment as to the relative trustworthiness of the data.

11. A non-transitory storage medium having stored therein instructions that are executable by one or more hardware processors to perform operations comprising:
generating a data confidence fabric billing manifest;
rendering the data confidence fabric billing manifest immutable by signing the data confidence fabric billing manifest;
creating a snapshot of the data confidence fabric billing manifest, wherein the snapshot comprises parameters including a smart contract billing logic, a data owner identification, digital wallet information of the data owner, vendor information of a trust service, a time to activate the smart contract billing logic, and a digital signature signed in the data confidence fabric billing manifest;
storing the snapshot of the data confidence fabric billing manifest at an initial node of a plurality of nodes;

broadcasting the snapshot to a specific subset of the plurality of nodes of the data confidence fabric, where the specific subset does not include at least one node of the plurality of nodes;

commanding a data confidence agent to pull the snapshot from the initial node where the snapshot is stored;

in response to the commanding, pulling, by the data confidence fabric configuration agent, the snapshot from the initial node;

deploying, by the data confidence fabric configuration agent and at the specific subset of nodes, the smart contract billing logic included in the snapshot of the data confidence fabric billing manifest; and activating, by the data confidence fabric configuration agent, the smart contract billing logic at the time and at the specific subset of nodes, thereby provisioning the trust services at the specific subset of nodes, where the activating further includes tracking and billing for the trust services rendered at the subset of nodes according to the parameters of the snapshot.

12. The non-transitory storage medium as recited in claim 11, wherein the billing logic comprises any one or more of: price-per-trust service; price-per-trust service-per vendor; or wallet depletion logic.

13. The non-transitory storage medium as recited in claim 11, wherein the information specifies which trust service are provided to which nodes.

14. The non-transitory storage medium as recited in claim 11, wherein the information obtained by executing the billing logic is provided to a trust service vendor.

15. The non-transitory storage medium as recited in claim 11, wherein the billing logic specifies an action to be taken if an owner of the data does not pay a trust services vendor for performance of the trust service.

16. The non-transitory storage medium as recited in claim 11, wherein terms of the data confidence fabric billing manifest have been agreed to by an owner of the data and a vendor of the trust service.

17. The non-transitory storage medium as recited in claim 11, wherein the snapshot includes a digital signature of a party to an agreement concerning the billing logic.

18. The non-transitory storage medium as recited in claim 11, wherein the data confidence fabric billing manifest specifies a ledger where annotations of the data, made by the trust service, are stored.

19. The non-transitory storage medium as recited in claim 11, wherein the data confidence fabric billing manifest specifies a ledger where billing information relating to the trust service is stored.

20. The non-transitory storage medium as recited in claim 11, wherein the trust service comprises annotating the data with an assessment as to the relative trustworthiness of the data.

* * * * *